United States Patent
Kingsford et al.

(10) Patent No.: US 7,412,139 B2
(45) Date of Patent: Aug. 12, 2008

(54) LIGHT TRANSMISSION

(75) Inventors: Howard A. Kingsford, Amherst, NH (US); Kristel Ferry, Methuen, MA (US); David P. Kraus, Jr., Amherst, NH (US); Mark A. Clarner, Concord, NH (US); William P. Clune, Hillsborough, NH (US)

(73) Assignee: Velcro Industries B.V. (AN)

( * ) Notice: Subject to any disclaimer, the term of this patent is extended or adjusted under 35 U.S.C. 154(b) by 78 days.

(21) Appl. No.: 11/300,216

(22) Filed: Dec. 13, 2005

(65) Prior Publication Data

US 2007/0133932 A1   Jun. 14, 2007

(51) Int. Cl.
  *G02B 6/44* (2006.01)
  *G02B 6/04* (2006.01)
  *B29D 11/00* (2006.01)

(52) U.S. Cl. .................. 385/100; 385/114; 264/1.24; 264/1.28; 264/1.29; 264/165; 264/167

(58) Field of Classification Search ............ 385/100, 385/102, 106, 114; 264/1.24, 1.28, 1.29, 264/165, 167
See application file for complete search history.

(56) References Cited

U.S. PATENT DOCUMENTS

| | | | |
|---|---|---|---|
| 4,602,191 A | 7/1986 | Davila | |
| 4,709,307 A | 11/1987 | Branom | |
| 4,794,028 A | 12/1988 | Fischer | |
| 5,492,580 A | 2/1996 | Frank | |
| 5,836,673 A | 11/1998 | Lo | |
| 6,395,121 B1 | 5/2002 | De Bastiani | |
| 6,402,336 B1 | 6/2002 | Reese | |
| 6,977,055 B2 * | 12/2005 | Gallant et al. | 264/167 |
| 2002/0039290 A1 | 4/2002 | Lemmens | |
| 2004/0016565 A1 | 1/2004 | Gallant et al. | |
| 2005/0057942 A1 | 3/2005 | Mako et al. | |
| 2005/0101192 A1 | 5/2005 | Foskey | |

FOREIGN PATENT DOCUMENTS

| | | |
|---|---|---|
| WO | WO93/03644 | 4/1993 |
| WO | WO01/03264 | 1/2001 |

* cited by examiner

*Primary Examiner*—Frank G Font
*Assistant Examiner*—Michael P Mooney
(74) *Attorney, Agent, or Firm*—Fish & Richardson P.C.

(57) ABSTRACT

A fiber optic cable comprising at least one light transmitter extending longitudinally along the cable and a body encompassing the light transmitter. The body includes an exposed surface having an array of fastener elements extending therefrom. The fastener elements arranged and constructed to engage mating fastener elements associated with a supporting surface to selectively secure the cable to the supporting surface.

17 Claims, 22 Drawing Sheets

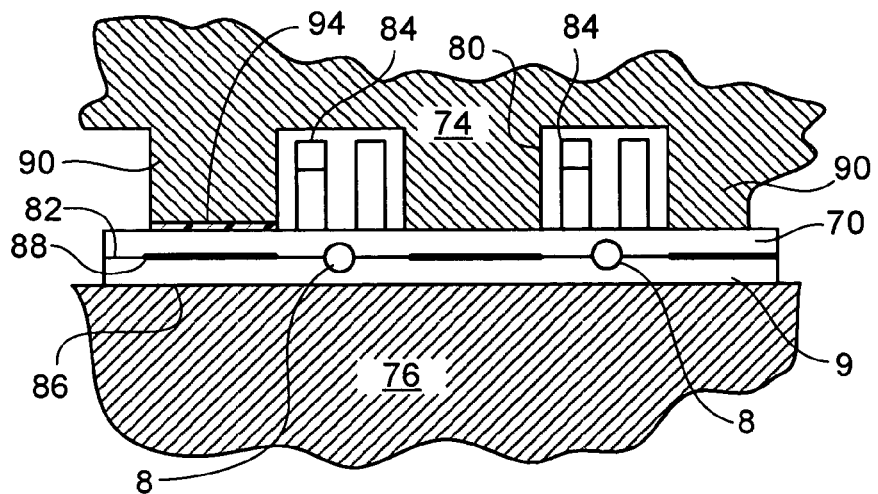
FIG. 9D
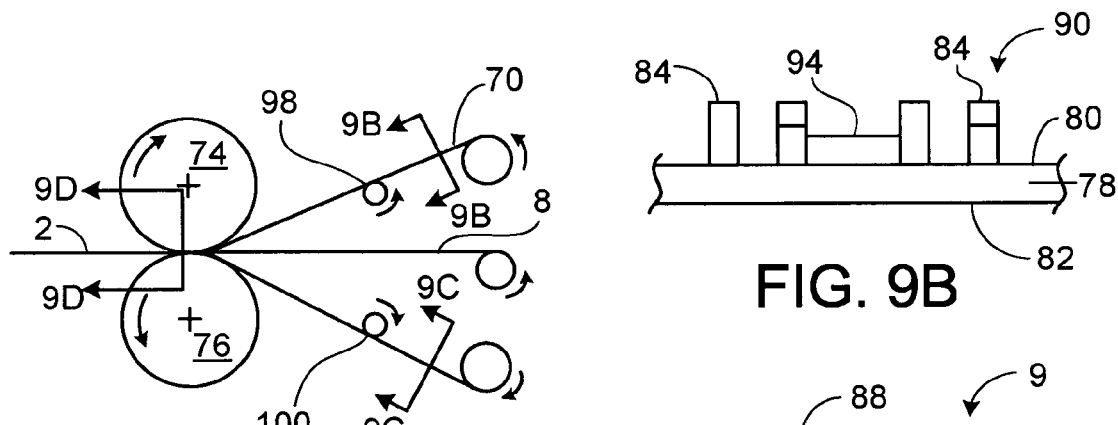
FIG. 9B
FIG. 9A
FIG. 9C
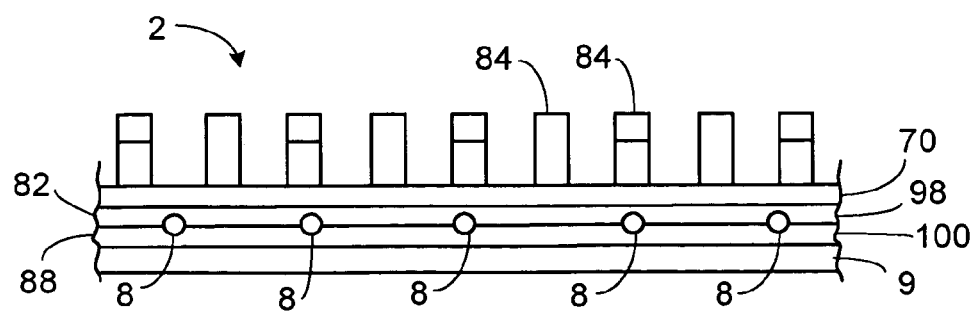
FIG. 9E

LIGHT TRANSMISSION

TECHNICAL FIELD

This invention relates to lighting and data transfer components, and more particularly to light transmission fibers.

BACKGROUND

An optical fiber is a transparent thin fiber, usually made of glass or plastic, for transmitting light. The optical fiber can be used as a medium for telecommunication and networking because it is flexible and can be bundled as cables. In addition to transferring data, fibers can also be used as light guides or fiber optic illuminators.

The light transmitted through the fiber is confined due to total internal reflection within the material. This is an important property that eliminates signal crosstalk between fibers within the cable and allows the routing of the cable with twists and turns. Because of the remarkably low loss and excellent linearity and dispersion behavior of single-mode optical fiber, data rates of up to 40 gigabits per second are available in real-world use on a single wavelength. Wavelength division multiplexing can then be used to allow many wavelengths to be used at once on a single fiber, allowing a single fiber to bear an aggregate bandwidth measured in terabits per second.

Optical fiber is used in vehicles such as airplanes and automobiles. Optical fiber is used in automobiles that have a Media Oriented Systems Transport (MOST) bus. The MOST bus is a multimedia fiber-optic point-to-point network implemented in a ring, star or daisy-chain topology over plastic optical fibers. The MOST bus specifications define a Physical (Electrical and Optical parameters) Layer as well as an Application Layer, a Network Layer, and Medium Access Control. The MOST bus provides an optical solution for automotive media networks such as video and audio.

Fiber optic light guides are used in applications where bright light needs to be brought to bear on a target without a clear line-of-sight path. Fiber optic illuminators can create a uniform visual effect over lengths of up to 130 feet/40 meters, depending on the illuminator and desired level of brightness.

Light emitters are a key element in any fiber optic system. Lasers or Light Emitting Diodes (LEDs) may be used as light emitters to illuminate light guides or fiber optic illuminators. An LED converts the electrical signal into a corresponding light signal that can be injected into the fiber. The light emitter is an important element because its characteristics often strongly influence the final performance limits of a given link. LEDs are complex semiconductors that convert an electrical current into light. The conversion process is fairly efficient in that it generates little heat compared to incandescent lights. LEDs are of interest for fiber optics because of five inherent characteristics: 1) They are small, 2) They possess high radiance (i.e., They emit lots of light in a small area), 3) The emitting area is small, comparable to the dimensions of optical fibers 4) They have a very long life, offering high reliability and 5) They can be modulated (turned off and on) at high speeds.

SUMMARY

In general, in one aspect, an elongated fiber optic cable includes at least one light transmitter extending longitudinally along the cable and a body encompassing the light transmitter. The body includes an exposed surface with an array of fastener elements extending from the body. The fastener elements are arranged and constructed to engage mating fastener elements associated with a supporting surface to selectively secure the cable to the supporting surface.

In some embodiments, the light transmitter may be a plastic optical fiber. In other embodiments, the light transmitter may be a glass optical fiber. In some embodiments, the optical fiber may be conducive to the transmission of light along the length of the fiber. In some other embodiments, the optical fiber may be conducive to the transmission of light from a proximate end of the fiber to a distal end of the fiber. In some embodiments, the elongated fiber optic cable may further comprise a light emitting diode device secured to the distal end of the fiber. In some embodiments, the fastener elements may comprise engageable heads. In some embodiments, the fastener elements comprise loop-engageable heads. In some embodiments, the fastener elements may comprise molded stems with downwardly directed molded ends. In some embodiments, the fastener elements are shaped to engage exposed loop fibers associated with the supporting surface. In some embodiments, the base may be a strip-form base.

In some embodiments, the exposed surface of the body comprises a first broad surface of thermoplastic resin, wherein the array of fastener elements are raised projections of the thermoplastic resin. In some other embodiments, the exposed surface of the body comprises a second broad surface of thermoplastic resin, wherein the array of fastener elements are raised projections of the thermoplastic resin. In some other embodiments, the array of fastener elements are substantially coextensive with said first broad surface of the body. In some embodiments, the array of fastener elements form a longitudinal band of fastener elements extending between lateral edge regions of the cable, the lateral edge regions being void of said fastener elements.

In some embodiments, the body comprises a laminate, the laminate including a first and a second layer of thermoplastic resin and an adhesive layer disposed therebetween, the first layer defining a first broad surface of the exposed surface, the second layer defining a second broad surface of the exposed surface, said array of fastener elements comprising raised projections of the thermoplastic resin of at least one of the first and the second broad surfaces. The exposed surface may further comprise a second broad surface of thermoplastic resin and a second array of fastener elements, in which the fastener elements comprise raised projections of the thermoplastic resin extending from the second broad surface. The array of fastener elements may be substantially coextensive with the first broad surface of the body. In other embodiments, the array of fastener elements may form a longitudinal band of fastener elements extending between lateral edge regions of the cable and the lateral edge regions are void of the fastener elements.

In some embodiments, the body comprises a laminate, the laminate includes a first and second layer of thermoplastic resin and an adhesive layer disposed between the layers, the first layer defines a first broad surface of the exposed surface, the second layer defines a second broad surface of the exposed surface, the array of fastener elements comprises raised projections of the thermoplastic resin of at least one of the first and second broad surfaces. In some cases, the body comprises a unitary structure of thermoplastic resin, in which the unitary structure defines a first and a second broad surface of the exposed surface, the array of fastener elements comprise raised projections of the thermoplastic resin of at least one of the first and second broad surfaces. In other embodiments, the body also comprises a first and second layer of thermoplastic resin with the conductors disposed between the first and second layer of thermoplastic resin, the first and second layers permanently welded to one another in a manner to encompass and isolate the optical fibers from one another, the array of fastener elements comprises raised projections of the thermoplastic resin of an exposed surface of one of the first and second layers. The fastener elements may be exposed loop fibers. In some cases, the body comprises a thermoplastic resin and the exposed loop fibers are part of a web of fibers, the web being attached to the body by encapsulation of fibers of the web by the thermoplastic resin. The web of fibers is a nonwoven material. In another aspect, the lighting device defines a fixed cable length between opposite longitudinal ends, the cable further comprising an optical connector optically attached to at least one of the light transmitters and mechanically attached to the cable at one of said longitudinal ends.

In some embodiments, the lighting device may further comprise a heat management system associated with the resin base sheet and arranged to conduct heat from the base of the light emitting diode device. In other embodiments, the heat management system may also comprise molded standoffs integral with the base defining air passages for convective heat transfer. In other embodiments, the heat management system may comprise a thermal conductive portion exposed for engagement by the light emitting diode device for conductive heat transfer. In other embodiments, the thermal conductive portion includes a phase change material. In other embodiments, the resin base sheet may comprise additives that increase the thermal conductivity of the resin base sheet. In other embodiments, the additives are chosen from the group consisting of titanium nitride, boron nitride, silica, aluminum oxide, and ceramic particles. In other embodiments, the heat management system may comprise radiative structures which are comprised of material with a high thermal conductivity in contact with the light emitting diode device. In other embodiments, the heat management system comprises a peltier junction with a hot-side of greater surface area than an associated cold side. In other embodiments, the resin base sheet may comprise a resin that preserves a thermoformed shape for temperatures up to 350 degrees Centigrade. In other embodiments, the heat management system may comprises a fan proximate the light emitting diode devices. The fan is less than 30 mm in diameter.

In general, in another aspect, a method of continuously forming an optical fiber cable includes introducing a moldable resin into a gap formed adjacent a peripheral surface of a rotating mold roll, the mold roll defining an array of cavities therein, the moldable resin being introduced under pressure and temperature conditions selected to cause the moldable resin to at least partially fill the cavities to form fastener element stems integrally with and extending from one broad surface of a strip of said moldable resin, while introducing at least one longitudinally continuous optical fiber to the gap so as to cause the optical fiber to become an integral part of the strip of moldable resin from which the fastener element stems extend and introducing a laminating material wherein the laminating material covers the optical fiber.

In some embodiments, the laminating material is simultaneously introduced into the gap. In some embodiments, the laminating material is introduced after the mold roll. In some embodiments, the method further comprises providing a heat management system to conduct heat from the cable and supporting the heat management system on the resin base. In some embodiments, the cavities of the mold roll are shaped to mold distal heads on the fastener element stems, the distal heads being shaped to overhang the broad surface of the strip of laminating material so as to be engageable with exposed loop fibers. In some embodiments, each of the stems defines a tip portion and the method further includes deforming the tip portion of a plurality of said stems to form engaging heads overhanging the broad side of the strip of material, the engaging heads being shaped to be engageable with exposed loop fibers. In some embodiments, the gap includes a nip defined between the rotating mold roll and a counter-rotating pressure roll. In some embodiments, the gap includes a nip defined as the space between the rotating mold roll and a counter-rotating mold roll, each of said rotating mold roll and said counter-rotating mold roll defining an array of cavities therein, the moldable resin being introduced under pressure and temperature conditions selected to cause the material to at least partially fill the array of cavities of each of said rotating and said counter-rotating mold roll to form fastener element stems integrally with and extending from each of opposite broad sides of the strip of said moldable resin. In some embodiments, the moldable resin includes a layer of thermoplastic resin and a film backing, the film backing carrying the optical fibers on a surface thereof, the layer of thermoplastic resin being introduced to the gap directly adjacent the rotating mold roll, the film backing carrying the optical fibers being introduced to the gap under pressure and temperature conditions which cause the film backing to become permanently bonded to the thermoplastic resin to at least partially envelop the optical fibers. In some embodiments, the moldable resin includes a first and a second film of thermoplastic resin, wherein the optical fibers and the first and second films are introduced to the gap with the optical fibers disposed between the first and the second film, said first film being introduced directly adjacent the rotating mold roll under temperature and pressure conditions that cause the first and second films to become permanently bonded to each other in a manner enveloping the optical fibers. In some embodiments, the method further includes severing longitudinally the laminating material after solidification to form two optical fiber cables downstream of the gap. In some embodiments, each cable contains at least one of the optical fiber.

In general, in another aspect, a method of continuously forming an optical fiber cable includes introducing molten resin into a gap formed adjacent a rotating mold roll, the mold roll having a peripheral surface defining an array of molding cavities therein, under pressure and temperature conditions selected to cause the resin to fill the mold cavities and form an array of fastener element stems integrally molded with and extending from a broad strip of resin; while simultaneously introducing a preformed optical fiber ribbon-type cable to the nip adjacent the pressure roll, such that the broad strip of resin becomes permanently bonded to a broad side of the ribbon-type cable such that the fastener element stems are exposed.

In general, in another aspect, a method of continuously forming an optical fiber cable comprising providing a fastener tape of continuous length, the fastener tape comprising a base of thermoplastic resin and defining a first and a second, opposite, broad surface, the array of loop engageable fastener elements comprising protrusions of the thermoplastic resin of the first surface, and an array of loop-engageable fastener elements, arranging a backing film of continuous length adjacent the fastener tape, the backing film defining a broad surface, the broad surface of the backing film being arranged to face the second broad surface of the fastener tape, disposing a plurality of spaced apart optical fibers of continuous length between the second broad surface of the fastener tape and the broad surface of the backing film and permanently attaching the fastener tape to the backing film with the plurality of optical fibers enveloped therebetween.

In some embodiments, the method may further includes permanently attaching the fastener tape to the backing film by heat welding along locations between the optical fibers.

In general, in another aspect, a method of forming an optical fiber cable comprises introducing a strip of laminating material into a gap formed adjacent a peripheral surface of a rotating roll, while introducing a continuous strip of loop material having hook-engageable fiber portion to the gap along the surface of the roll, under conditions selected to cause the loop material to become at least partially embedded in the laminating material to permanently bond the loop material to the laminating material while leaving the hook-engageable fiber portions exposed for engagement, and introducing at least two longitudinally continuous and spaced apart optical fibers to the gap so as to cause the material to envelop and isolate the optical fibers in the gap to form a multi-optical fibers cable having engageable loops extending from an outer surface thereof.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9A-E illustrates another method and apparatus for producing the above described fiber optic cable.

Like reference symbols in the various drawings indicate like elements.

DETAILED DESCRIPTION

The apparatus and methods disclosed in this application build upon the continuous extrusion/roll-forming method for molding fastener elements on an integral, sheet-form base described by Fischer in U.S. Pat. No. 4,794,028, the nip lamination process described by Kennedy et al. in U.S. Pat. No. 5,260,015, method for forming an elongated electrical cable described by Gallant et al. in U.S. application Ser. No. 10/423,816 and the methods and apparatuses of U.S. Application 60/703,330 the entire contents of these documents are incorporated herein by reference. Generally, any of the methods described in Gallant may be used in order to produce a continuous fiber optic cable. The process to produce a continuous optical fiber is almost the same except that unlike the electrical cables in Gallant, the optical fibers do not need to be insulated from one another. The reader is referred to these publications for further information. The relative position and size of the rolls and other components is not to scale.

Figure 1A:
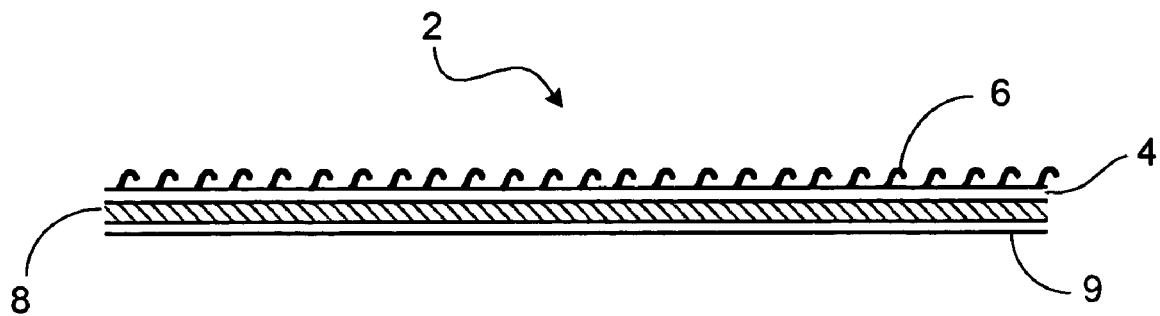
FIGS. 1A and 1B shows a laminated fiber optic cable.
Figure 1B:
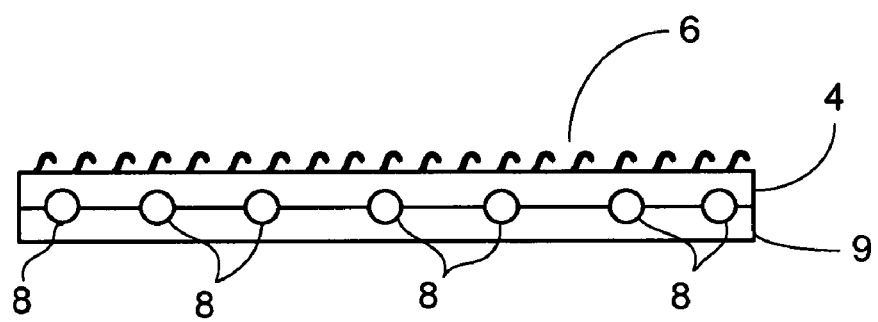

FIGS. 1A and 1B is a fiber optic cable 2 comprised of a substrate 4 with an array of fastener elements 6 on the front side and at least one optical fiber 8 fixed or embedded on the back side. In some embodiments, the optical fiber 8 is covered by a laminate 9. In some embodiments, the optical fiber 8 may each be a bundle of multiple optical fibers. In some embodiments, the optical fibers 8 may vary in length so that the endpoint of each optical fiber 8 may be distributed to different locations. The laminate 9 may be either opaque or translucent. The optical fiber may be used to transmit data, transmit light from one end of the cable to the other end of the cable, as in a light guide, or transmit light along the length of the cable, as in a fiber optic illuminator.

Figure 1C:
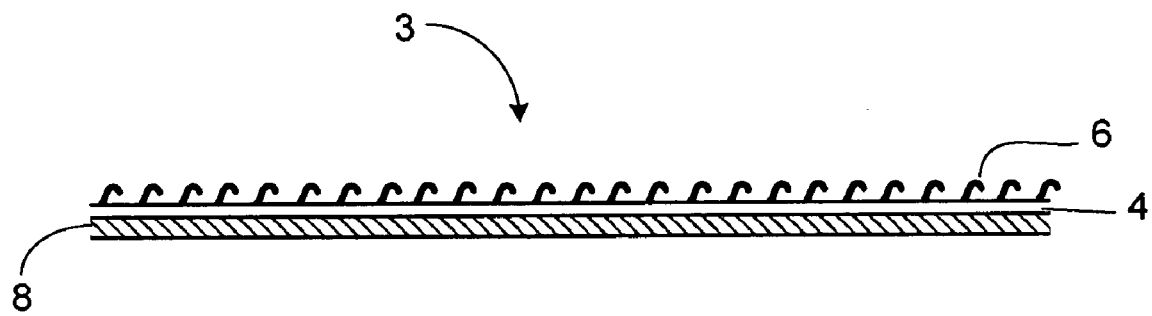
FIGS. 1C and 1D shows an unlaminated fiber optic cable.
Figure 1D:
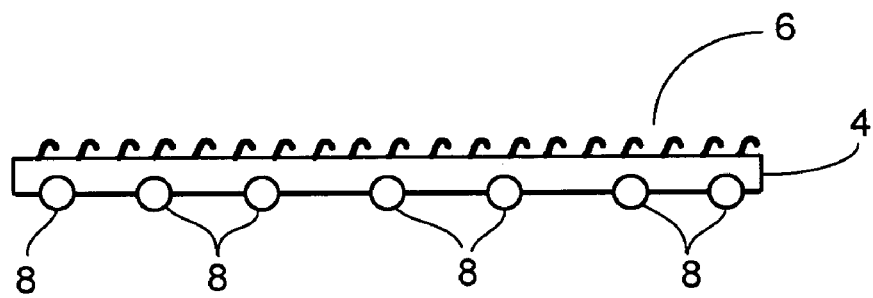

FIGS. 1C and 1D is a fiber optic cable 3 comprised of a substrate 4 with an array of fastener elements 6 on the front side and at least one optical fiber 8 fixed or embedded on the back side. In this embodiment the optical fiber 8 is exposed.

Figure 1E:
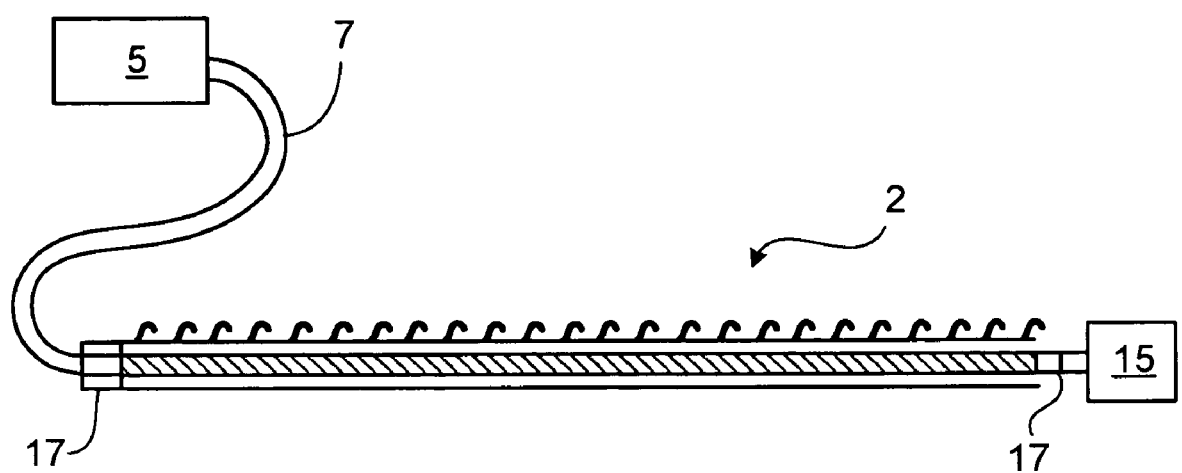
FIG. 1E shows a fiber optic cable used to transmit data.

FIG. 1E is a fiber optic cable 2 with a light emitter 5, such as a laser, an LED or any other type of light emitter compatible with optical fibers. In some embodiments, the light emitter is connected to a light guide 7 which is then connected to the fiber optic cable 2. In some embodiments, the light emitter is connected directly to the fiber optic cable 2. In some embodiments, such as in FIG. 1E, the fiber optic cable 2 may be used to transfer data to a receiver 15 which demodulates the signal from the light emitter 5. The connectors 17 may be selected from standard fiber optic connectors such as an ST connector (a slotted bayonet type connectors), an SC Connector (a push/pull type connector) or any connector known in the industry.

Figure 1F:
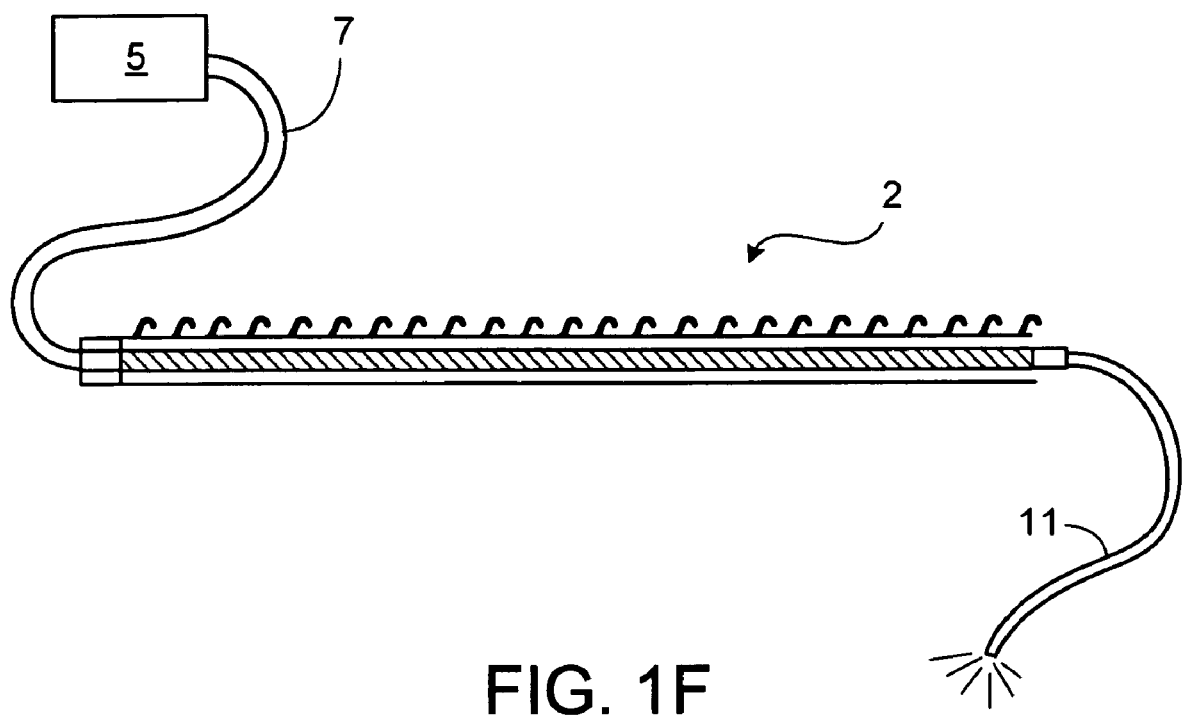
FIG. 1F shows a fiber optic cable used as a light guide.
Figure 1G:
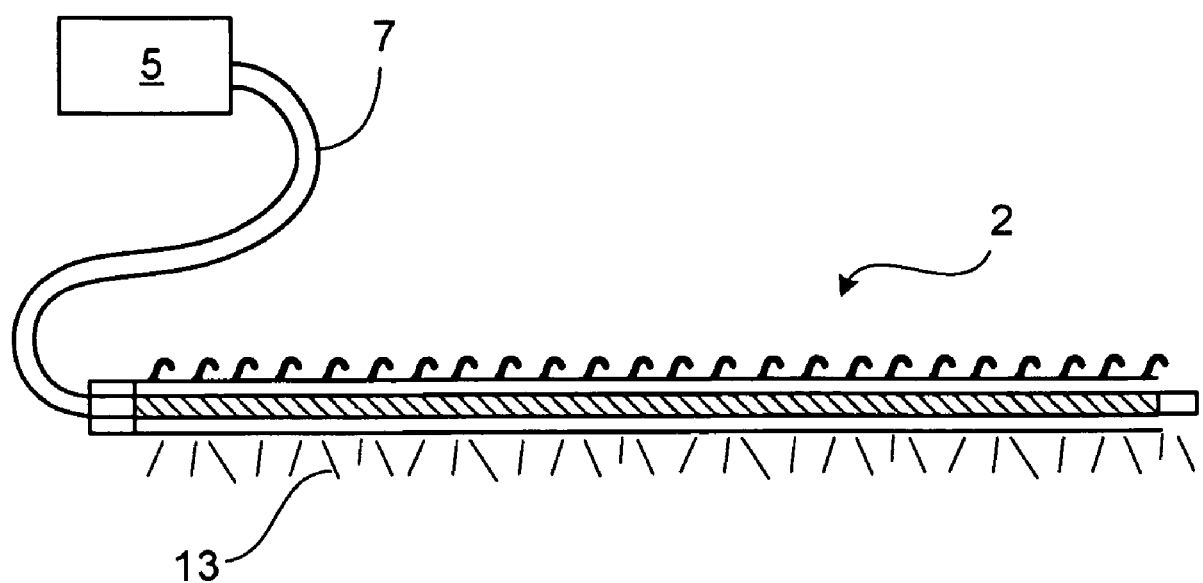
FIG. 1G shows a fiber optic cable used as a fiber optic illuminator.

In some embodiments, such as in FIG. 1F, the fiber optic cable 2 may be used to as a light guide 11 to illuminate a desired object or space. In some embodiments, such as in FIG. 1G, the fiber optic cable 2 may be used to as a fiber optic illuminator 13 to illuminate an area along the entire length of the fiber optic cable 2. In some embodiments, such as in FIG. 1H, the fiber optic cable 2 may be used to as a fiber optic illuminator 13 to illuminate predetermined points 19 along the length of the fiber optic cable 2 or they may be used to create patterns which display such things as logos, trademarks, names and designs to name a few.

Figure 1H:
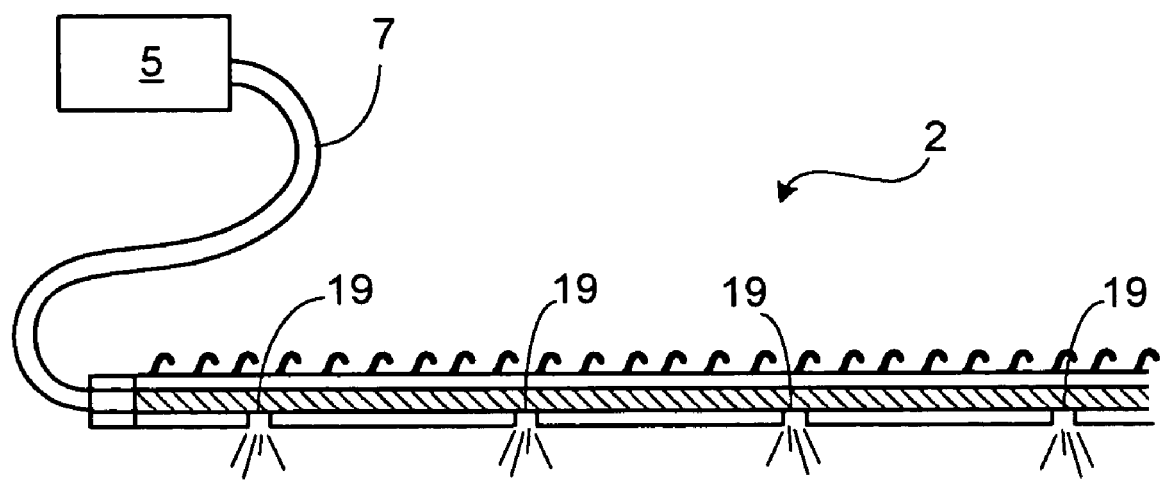
FIG. 1H shows a fiber optic cable used used as a fiber optic illuminator with voids in the laminate.
Figure 2:
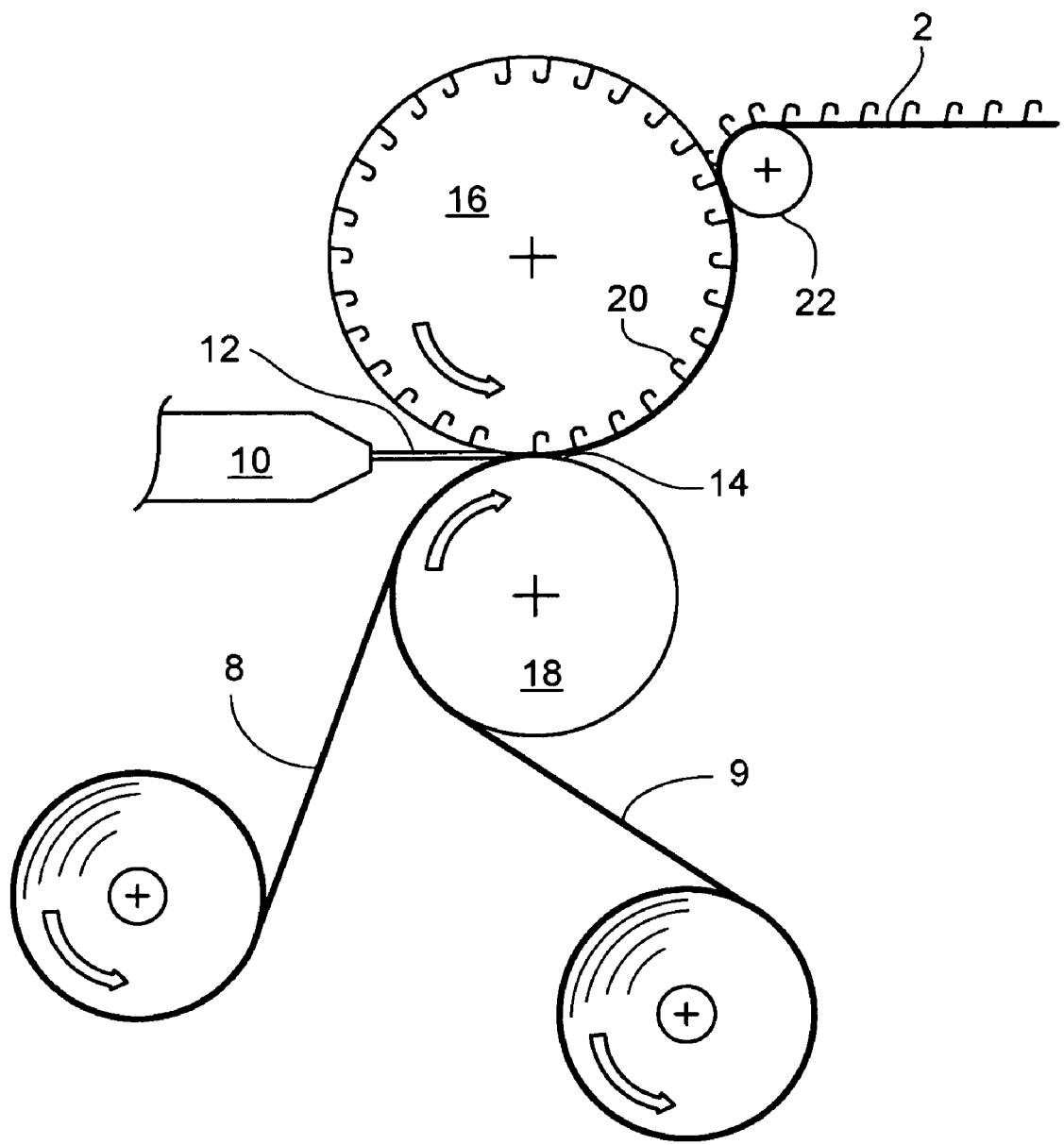
FIG. 2-2E illustrates one method and apparatus for producing a laminated fiber optic cable.

FIG. 2 illustrates one method and apparatus for producing a laminated fiber optic cable 2. An extrusion head 10 supplies a continuous sheet of molten resin 12 to a nip 14 between a rotating mold roll 16 and a counter-rotating pressure roll 18 (nip arrangement illustrated in FIG. 2A). The mold roll 16 contains an array of miniature, fastener element shaped mold cavities 20 extending inward from its periphery for molding the fastener protrusions. Pressure in nip 14 forces resin into the fastener element cavities 20 and forms the substrate 4. Along with the molten resin 12, a continuous optical fiber 8 is fed into nip 14, where it is bonded with resin 12 and becomes permanently secured to the back face of the substrate 4. Along with the molten resin 12 and the continuous optical fiber 8, a laminate 9 is fed into nip 14, where it is bonded with resin 12 and becomes permanently secured to the back face of the substrate 4 while covering the optical fiber 8. The resulting fiber optic cable 2 is cooled on the mold roll 16 until the solidified fastener elements are stripped from their fixed cavities by a stripper roll 22. The laminated fiber optic cable 2 that is stripped from the mold roll 16 includes fastener elements 6, an optical fiber 8 and a laminate 9 as shown in FIG. 1.

Figure 2A:
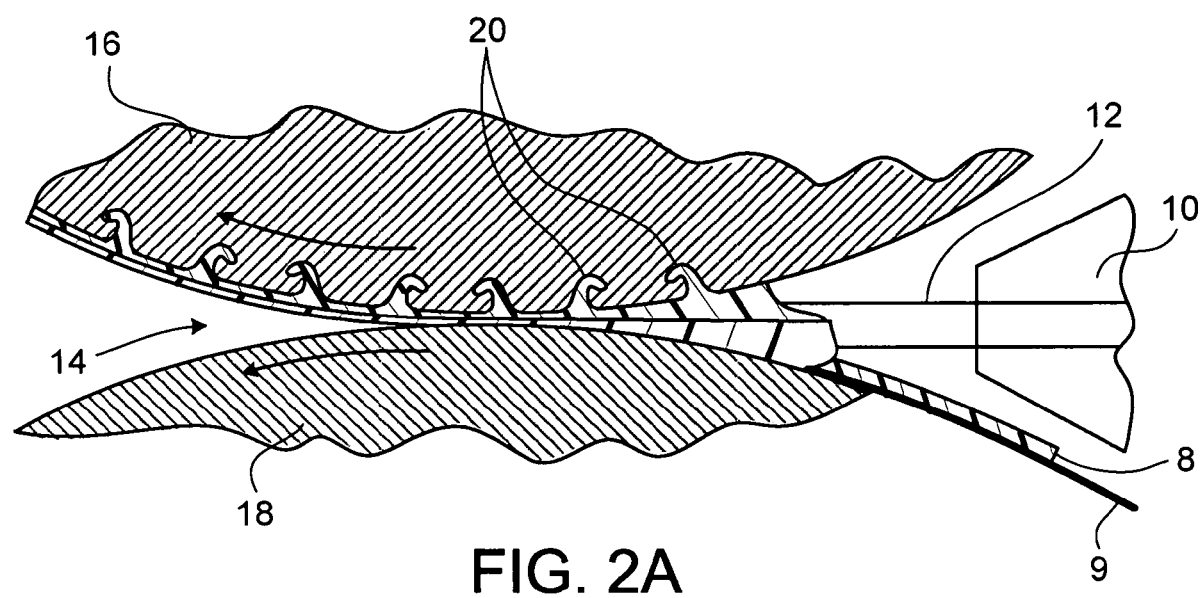
Figure 2B:
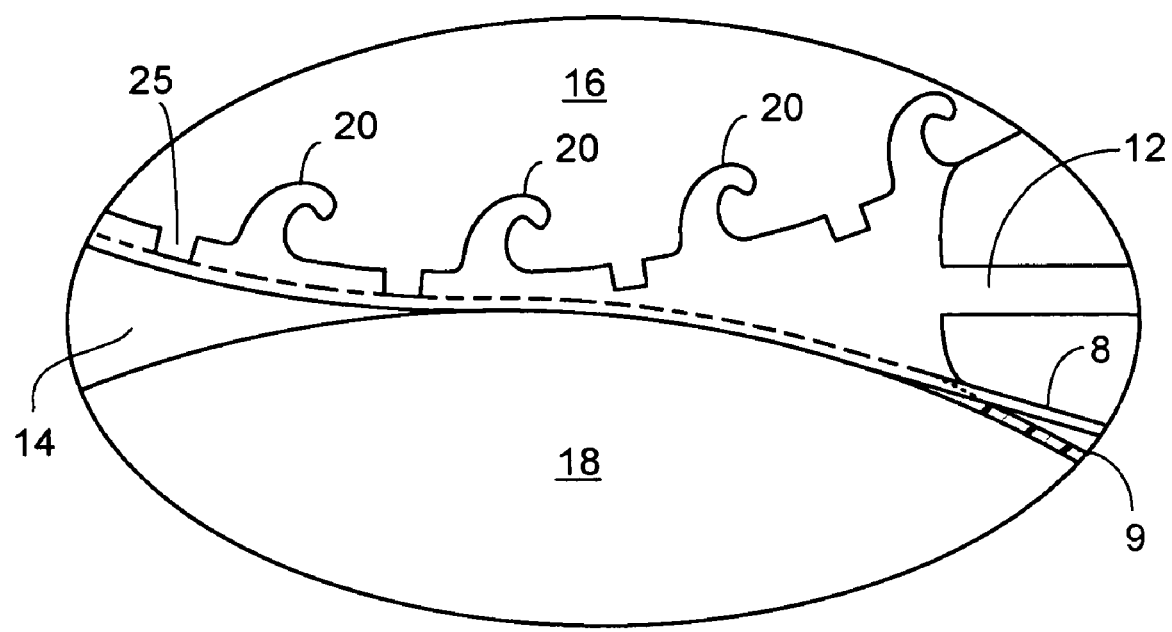
Figure 2C:
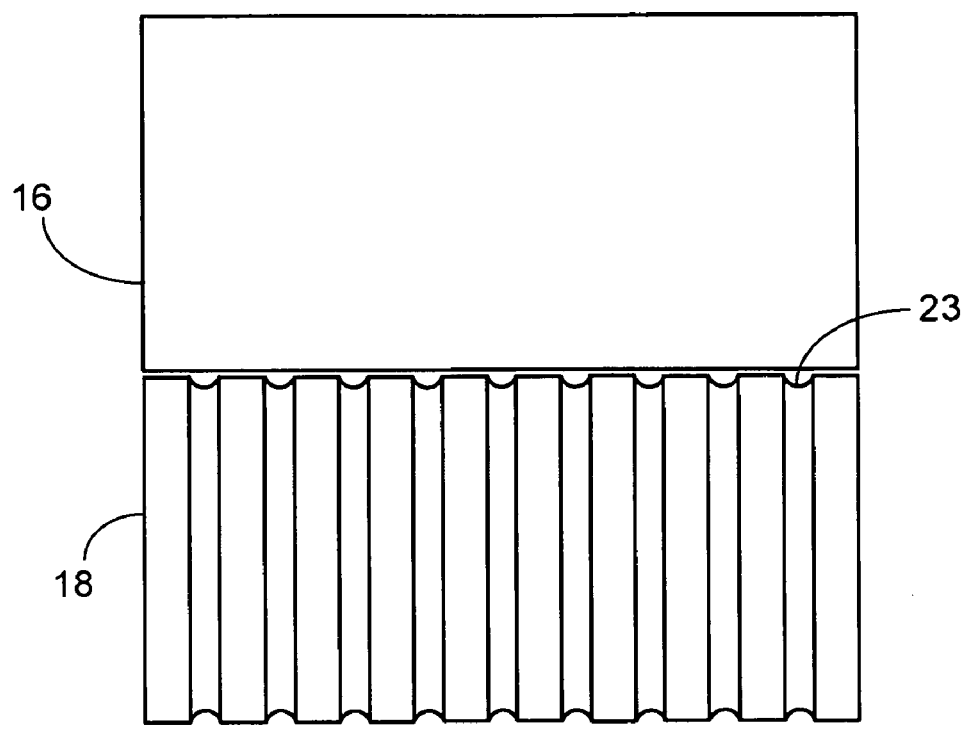
Figure 2D:
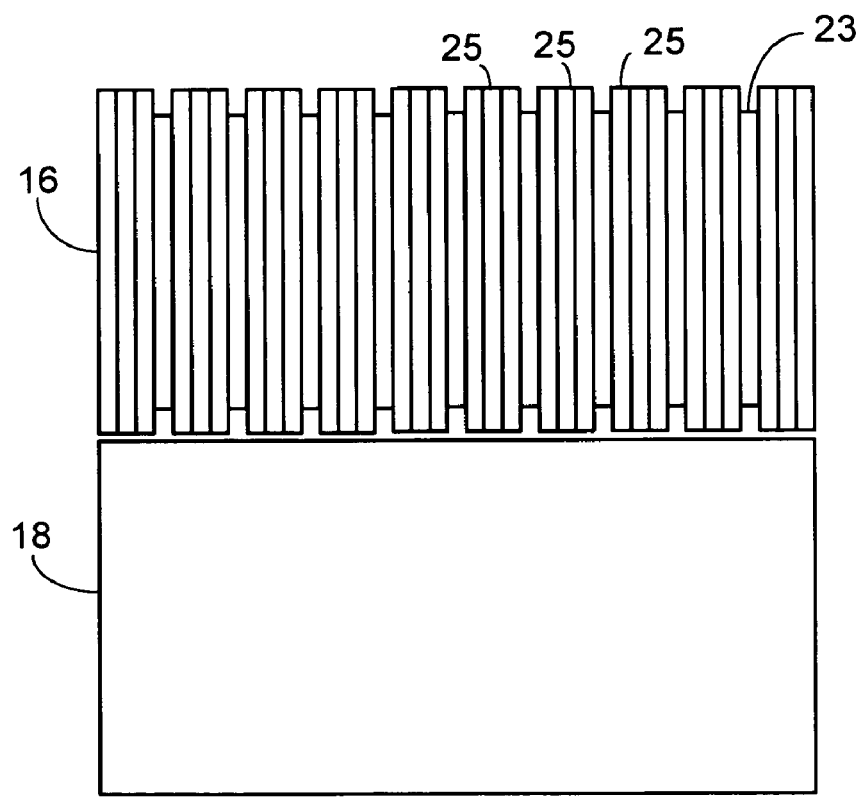
Figure 2E:
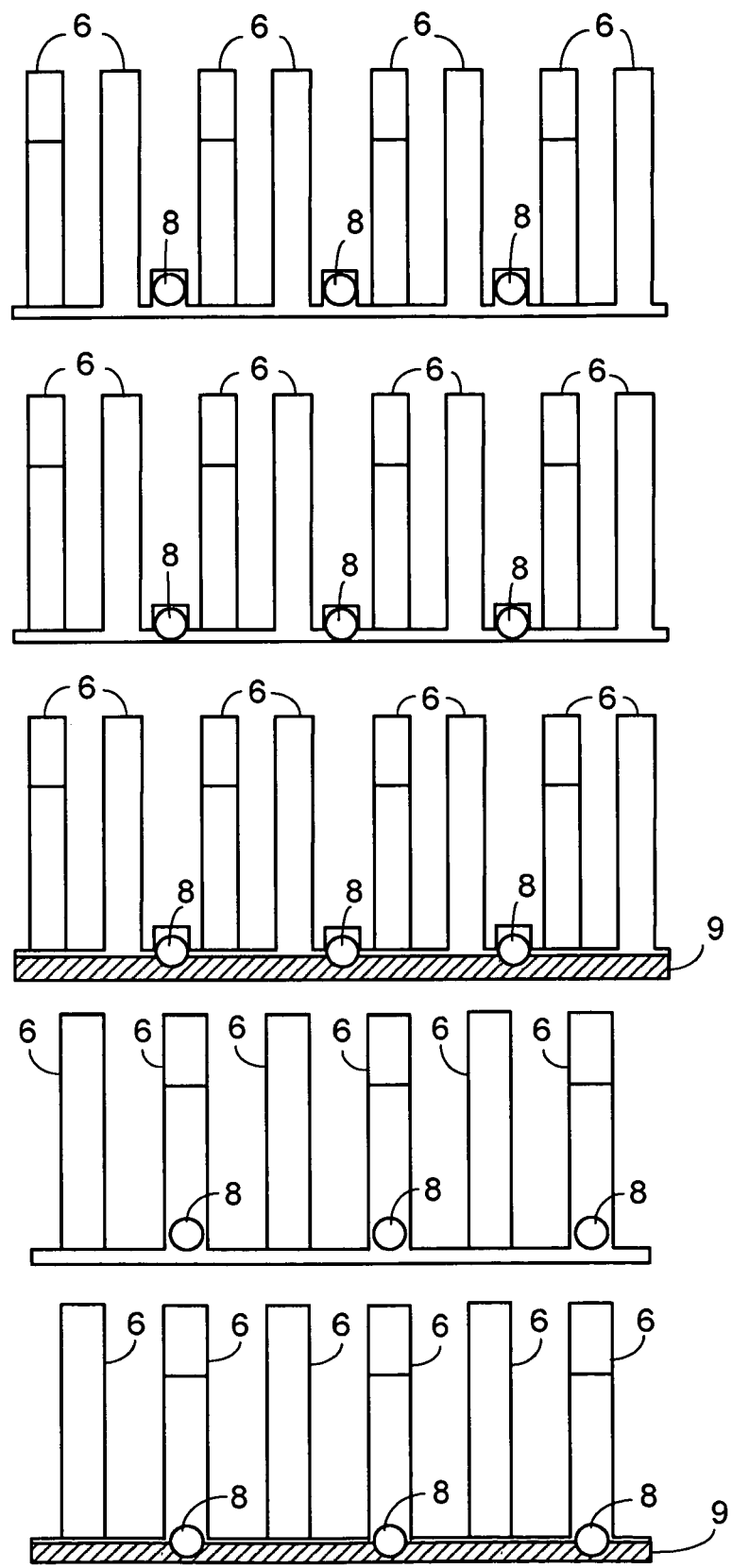

Referring to FIG. 2C, a nip arrangement includes channels 23 on a mold roll 16 in order to isolate and keep the optical fibers a predetermined distance apart. Referring to FIG. 2D, a nip arrangement includes channels 23 on a mold roll 16 created by using spacer rings in order to isolate and keep the optical fibers a predetermined distance apart. The tooling of these rolls can be accomplished in many different ways to produce a variety of different optical fiber layouts as shown in FIG. 2E, including embodiments in which the optical fiber 8 is incorporated within the fastener element 6.

By replacing the nip arrangement FIG. 2A with the nip arrangement shown in FIG. 2B, the protrusions 25 will cause voids 19 to be created in the laminate 9. The laminated fiber optic cable 2 that is stripped from the mold roll 16 includes fastener elements 6, an optical fiber 8, a laminate 9 and voids 19 as shown in FIG. 1H.

Figure 3:
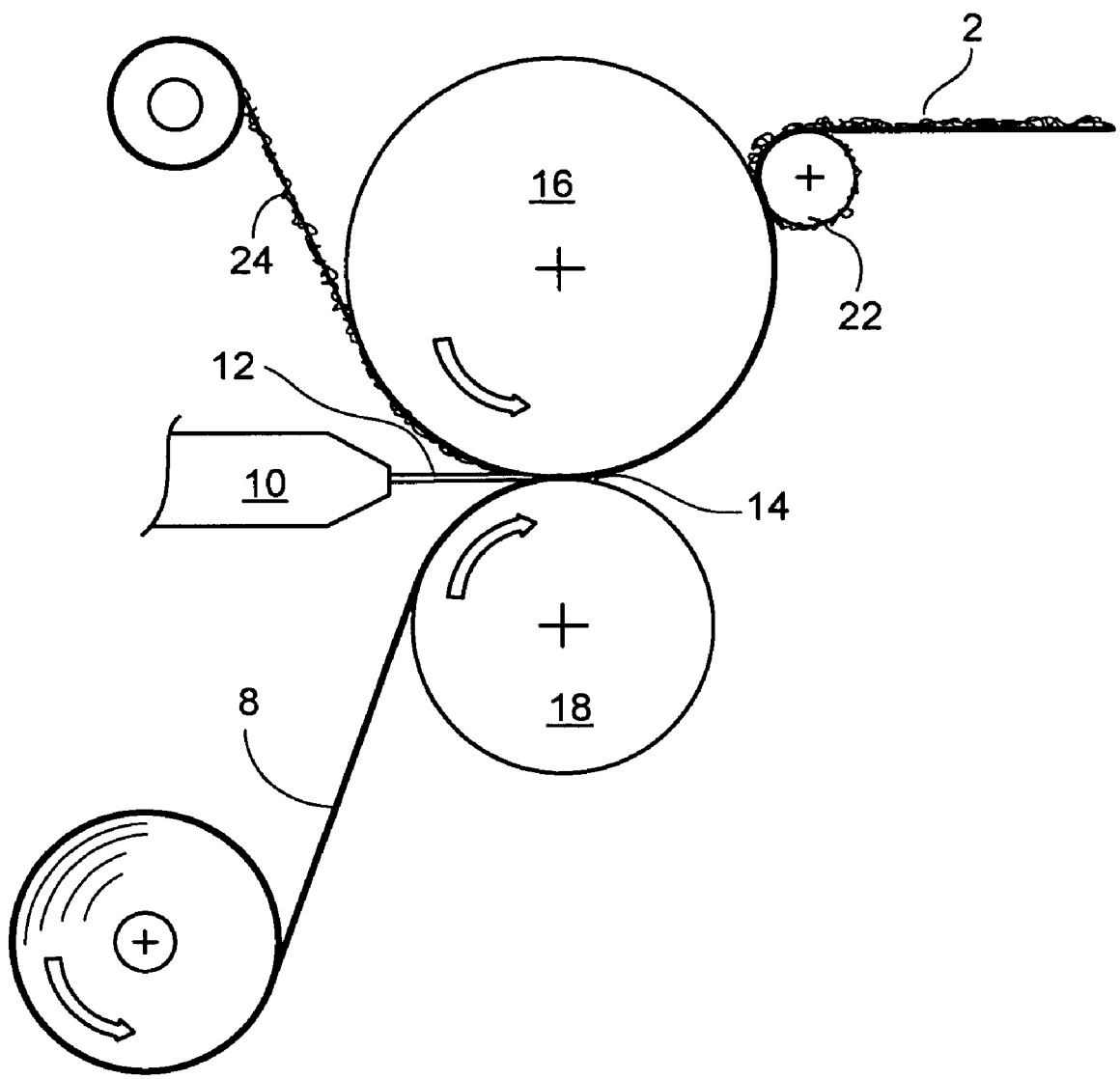
FIGS. 3 and 3A illustrates another method and apparatus for producing an unlaminated fiber optic cable.

FIG. 3 illustrates another method and apparatus for producing an unlaminated fiber optic cable 3. In this method, optical fiber 8 and a continuous strip of loop material 24 are fed into nip 14 along with extruded resin 12. Nip 14 is formed between mold roll 16 and pressure roll 18. In this embodiment, mold roll 16 lacks fastener element forming cavities. The optical fiber 8 and the loop material 24 are bonded to the substrate 4 by pressure in the nip 14. The resulting fiber optic cable 2 is cooled on the mold roll 16 until the solidified fastener elements are stripped from their fixed cavities by a stripper roll 22. The unlaminated fiber optic cable 3 that is stripped from the mold roll 16 includes fastener elements 6, and at least one optical fiber 8.

Figure 3A:
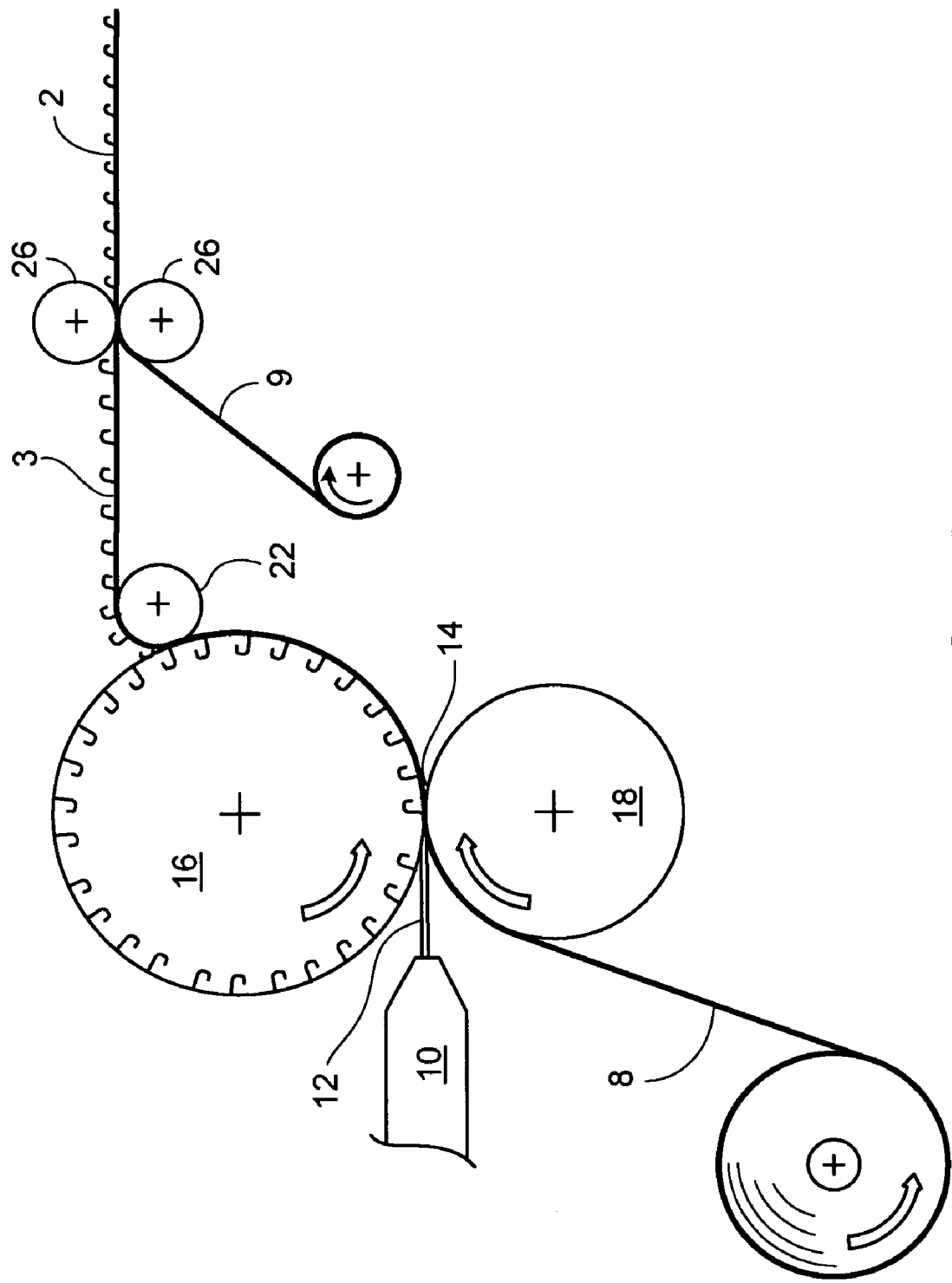

FIG. 3A illustrates another method and apparatus for producing an optical fiber cable 2. In this method, optical fiber 8 is fed into nip 14 along with extruded resin 12. Nip 14 is formed between mold roll 16 and pressure roll 18. In this embodiment, the mold roll 16 contains an array of miniature, fastener element shaped mold cavities 20 extending inward from its periphery for molding the fastener protrusions. Pressure in nip 14 forces resin into the fastener element cavities 20 and forms the substrate 4. The optical fiber 8 is bonded to the substrate 4 by pressure in the nip 14. The unlaminated fiber optic cable 3 is cooled on the mold roll 16 until the solidified fastener elements are stripped from their fixed cavities by a stripper roll 22. Along with the unlaminated fiber optic cable 3, a laminating material is fed into a front face idler 26, where it becomes permanently secured to the back face of the substrate 4 while covering the optical fiber 8. The laminated fiber optic cable 2 that is emerges from the front face idler 26 includes fastener elements 6, an optical fiber 8 and a laminate 9 as shown in FIG. 1.

Figure 4:
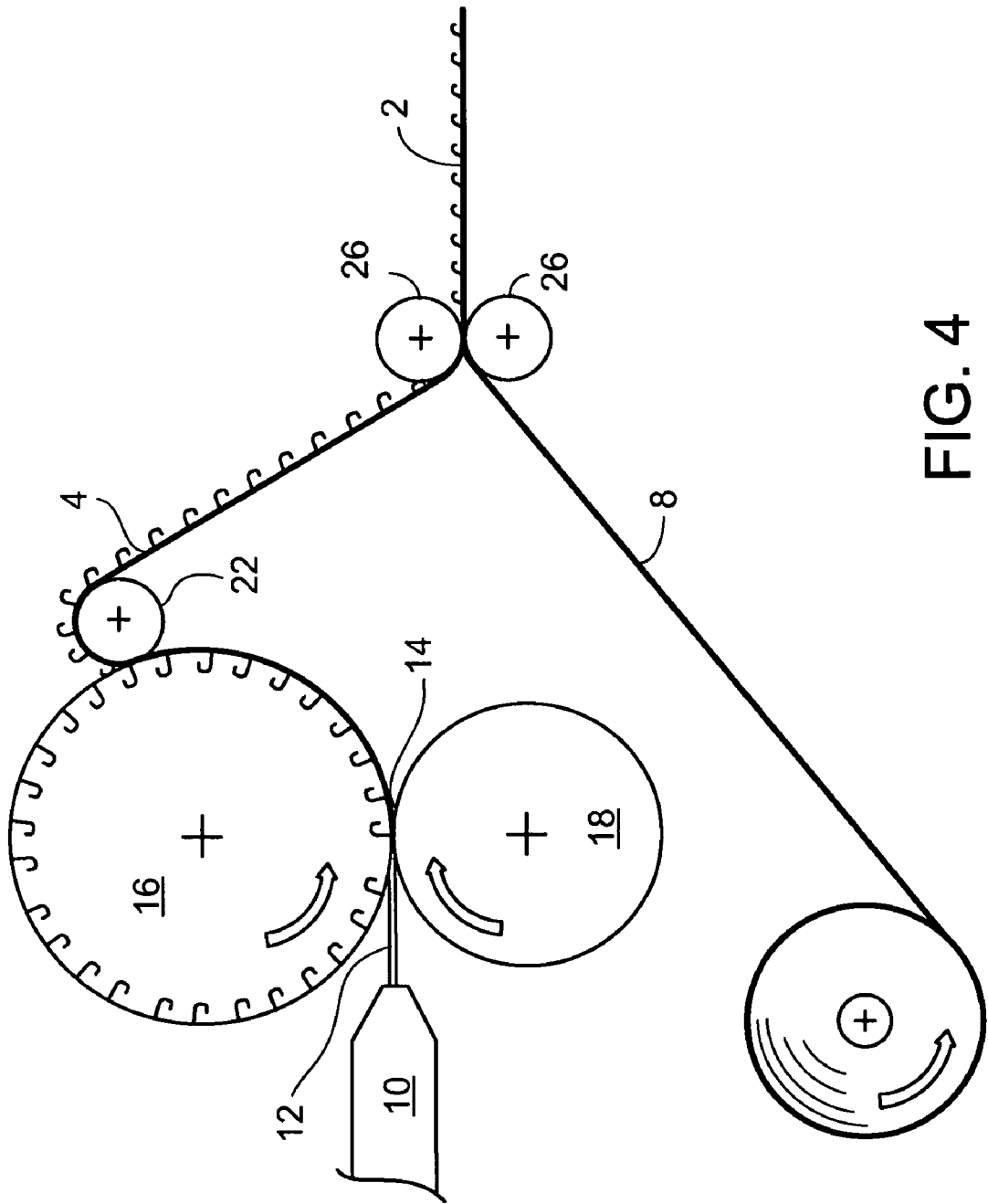
FIG. 4 illustrates another method and apparatus for producing an unlaminated fiber optic cable.

FIG. 4 illustrates another method and apparatus for producing an unlaminated fiber optic cable 3. An extrusion head 10 supplies a continuous sheet of molten resin 12 to a nip 14 between a rotating mold roll 16 and a counter-rotating pressure roll 18 (nip arrangement illustrated in FIG. 2A). The mold roll 16 contains an array of miniature, fastener element shaped mold cavities 20 extending inward from its periphery for molding the fastener protrusions. Pressure in nip 14 forces resin into the fastener element cavities 20 and forms the substrate 4. The substrate 4 is cooled on the mold roll 16 until the solidified fastener elements are stripped from their fixed cavities by a stripper roll 22. The substrate 4 is then fed through a front face idler 26 that is heated and has a contoured surface to bond the optical fiber 8 and the substrate 4 in desired areas while not damaging the fastener elements 6. The unlaminated fiber optic cable 3 that is stripped from the mold roll 16 includes fastener elements 6, and at least one optical fiber 8.

Figure 5A:
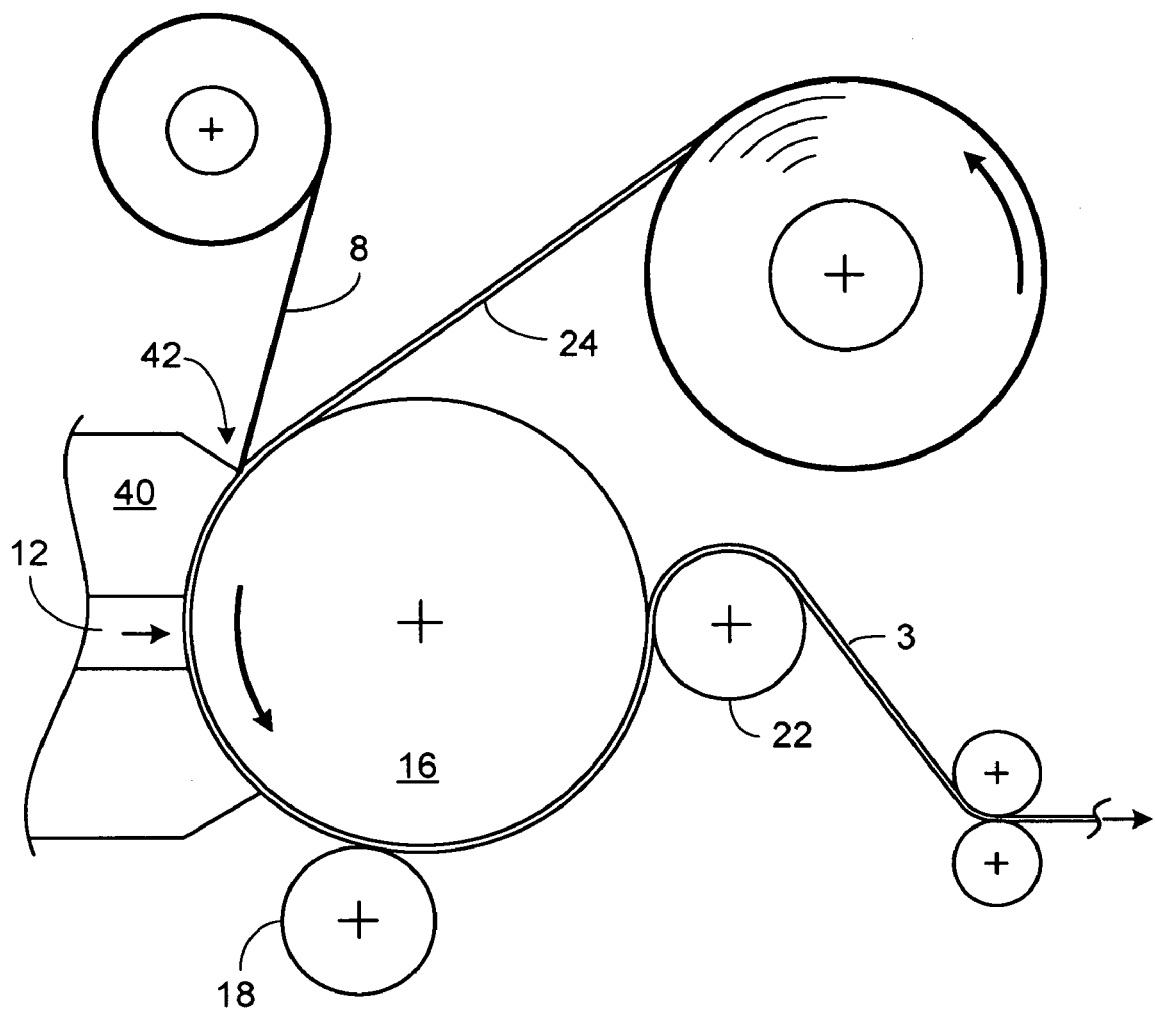
FIG. 5A-5B illustrates another method and apparatus for producing an unlaminated fiber optic cable.

FIG. 5A illustrates another method and apparatus for producing an unlaminated fiber optic cable 3. The contoured surface of an extrusion head 40 (sometimes called an injection head) is placed adjacent a mold roll 16 (mold roll 16 once again lacking fastener protrusion shaped cavities to produce the fastener elements 6), and a continuous flow of molten resin 12 is injected under pressure into the gap 42 defined between head 40 and mold roll 16, filling gap 42 and forming the front and back faces of the substrate. A strip of loop material 24 is fed through a predetermined region of gap 42, and held up against the surface of mold roll 16 by resin pressure in the gap. Optical fiber 8 is laminated to the back face of the substrate while the molded product is retained on mold roll 16, by pressure supplied by pressure roll 18. The unlaminated fiber optic cable 3 that is stripped from the mold roll 16 includes fastener elements 6, and at least one optical fiber 8.

Figure 5B:
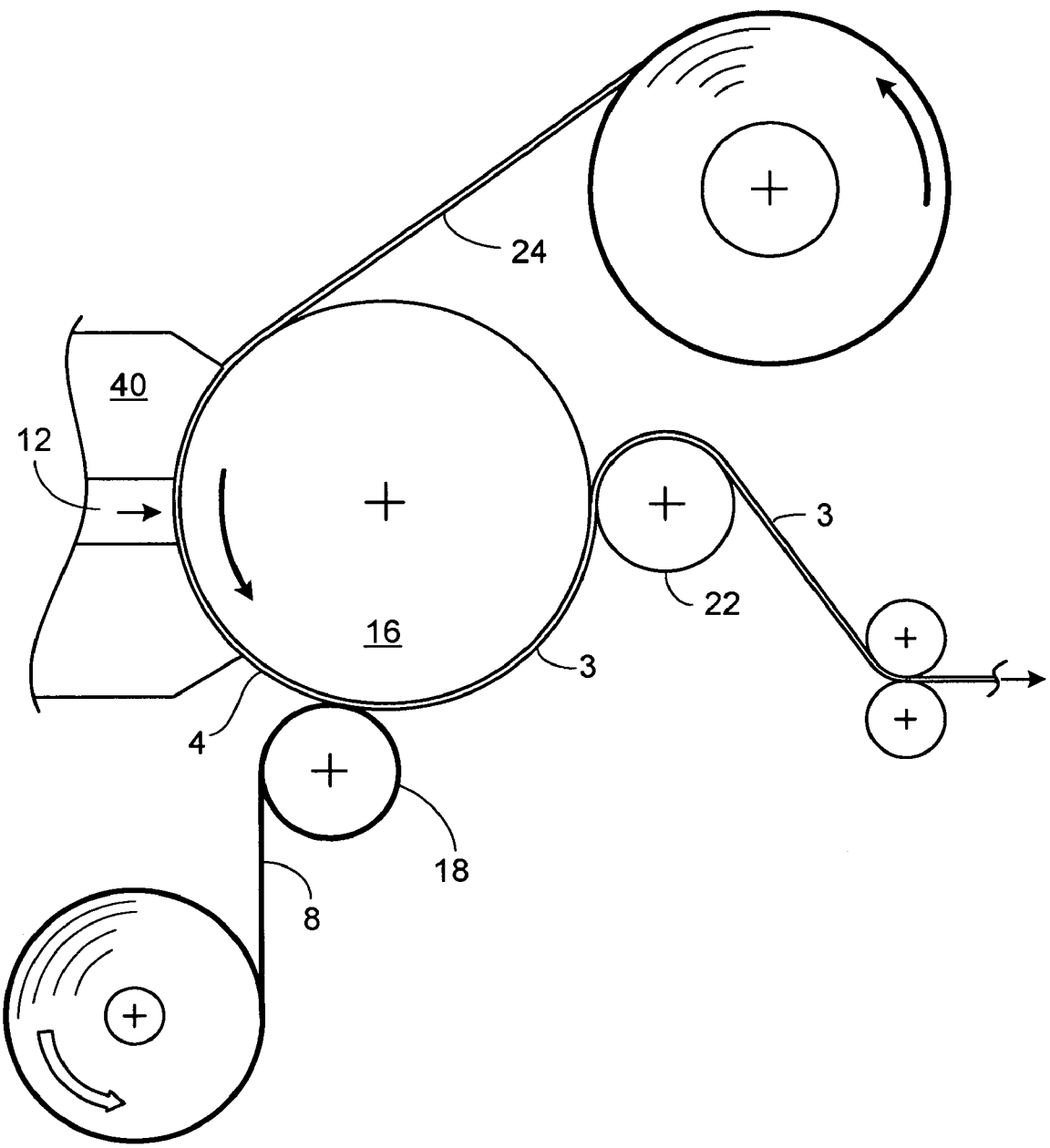

FIG. 5B illustrates another method and apparatus for producing an unlaminated fiber optic cable 3. The contoured surface of an extrusion head 40 is placed adjacent a mold roll 16 (mold roll 16 once again lacking fastener protrusion shaped cavities to produce the fastener elements 6), and a continuous flow of molten resin 12 is injected under pressure into the gap 42 defined between head 40 and mold roll 16, filling gap 42 and forming the front and back faces of the substrate. A strip of loop material 24 is fed through a predetermined region of gap 42, and held up against the surface of mold roll 16 by resin pressure in the gap. After the substrate 4 emerges from the gap 42, an optical fiber 8 is where it becomes permanently secured to the back face of the substrate 4 while the unlaminated fiber optic cable 3 is retained on mold roll 16, by pressure supplied by pressure roll 18. The unlaminated fiber optic cable 3 that is stripped from the mold roll 16 includes fastener elements 6, and at least one optical fiber 8.

Figure 6:
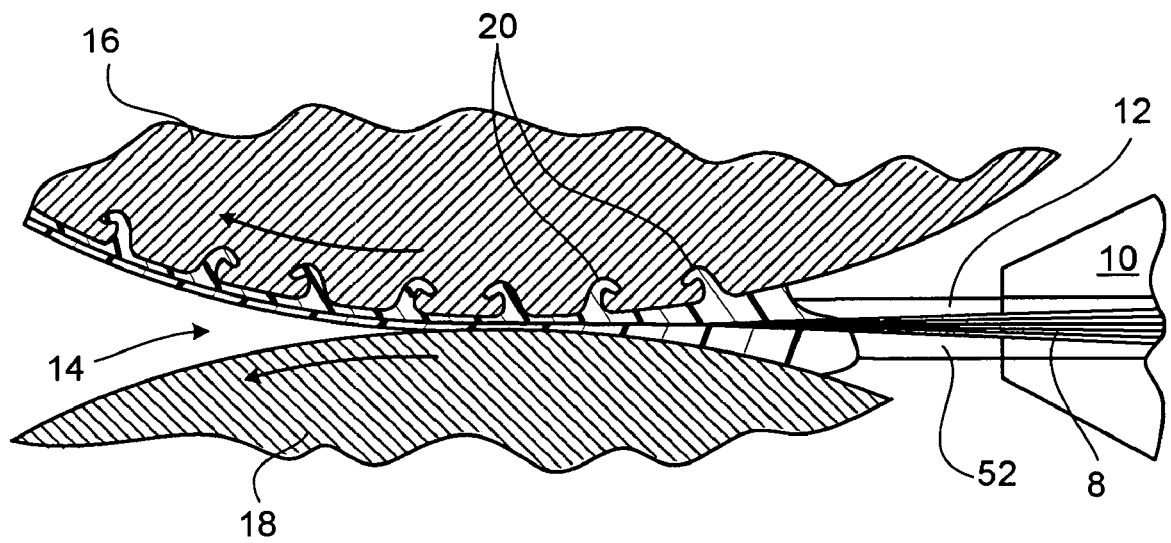
FIG. 6 illustrates another method and apparatus for producing the above described fiber optic cable.

FIG. 6 illustrates another method and apparatus for producing the above described fiber optic cable 2. In this embodiment extrusion head 10 supplies resin flows or films 12, 52 into nip 14 formed by mold roll 16 (the mold roll having fixed fastener element molding cavities 20) and pressure roll 18, respectively. The arrangement of nip 14 is as described above in reference to FIGS. 2 and 2A. Simultaneous with the resin feed, at least one strand of bare optical fiber 8 is fed through an extrusion die of extruder head 10 into nip 14 between the separate resin flows or films 12, 52. Pressure and temperature conditions in nip 14 force resin flow or film 12, 52 to flow into the molding cavities, encapsulates optical fiber 8 within resins 12, 52, and bonds separate resin flows or films 12, 52 to create an integral cable product having at least one optical fiber 8 within a substrate and fastener protrusions extending from a surface of the substrate. The laminated fiber optic cable 2 that emerges from the nip 14 includes fastener elements 6, an optical fiber 8 and a laminate 9 as shown in FIG. 1.

Figure 7:
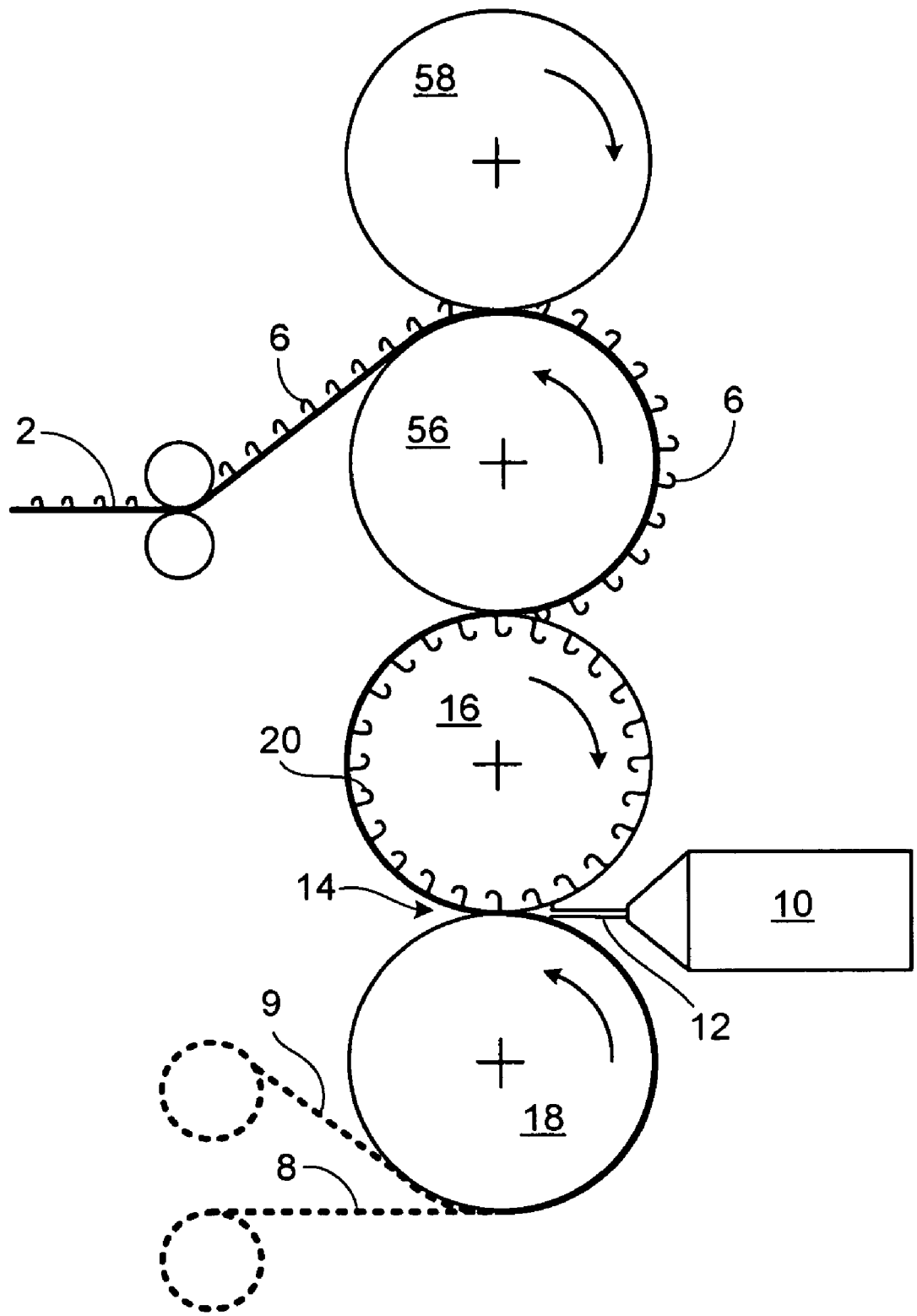
FIG. 7 illustrates another method and apparatus for producing the above described fiber optic cable.

FIG. 7 illustrates another method and apparatus for producing the above described fiber optic cable 2. Multiple optical fibers 8 and a laminate 9 are fed into nip 14 formed by rotating mold roll 16 and counter-rotating pressure roll 18. Optical fibers 8 are laterally spaced apart from one another as they enter nip 14. In order to control the lateral position of the wires as they enter the nip, pressure roll 18 is provided with individual grooves, one for each wire introduced, to prevent the wires from wandering laterally as they approach the nip 14. Simultaneously with the optical fibers 8 and a laminate 9, molten resin 12 is introduced to nip 14 from extruder head 10. Pressure and temperature conditions in the nip 14 cause the molten resin 12 to fill fastener element shaped mold cavities 20 in mold roll 16 and ensures that the optical fibers 8 becomes permanently secured to the back face of the substrate 4. As the cooled mold roll continues to rotate, the resin and optical fibers 8 remain adjacent the periphery of the mold roll 16 until take-off rollers 56 and 58 strip the laminated fiber optic cable 2 from the mold roll 16, thus extracting the now solidified hooks 6 from their respective cavities 20. The laminated fiber optic cable 2 that emerges from the take-off rollers 56 and 58 includes fastener elements 6, an optical fiber 8 and a laminate 9 as shown in FIG. 1.

Figure 8:
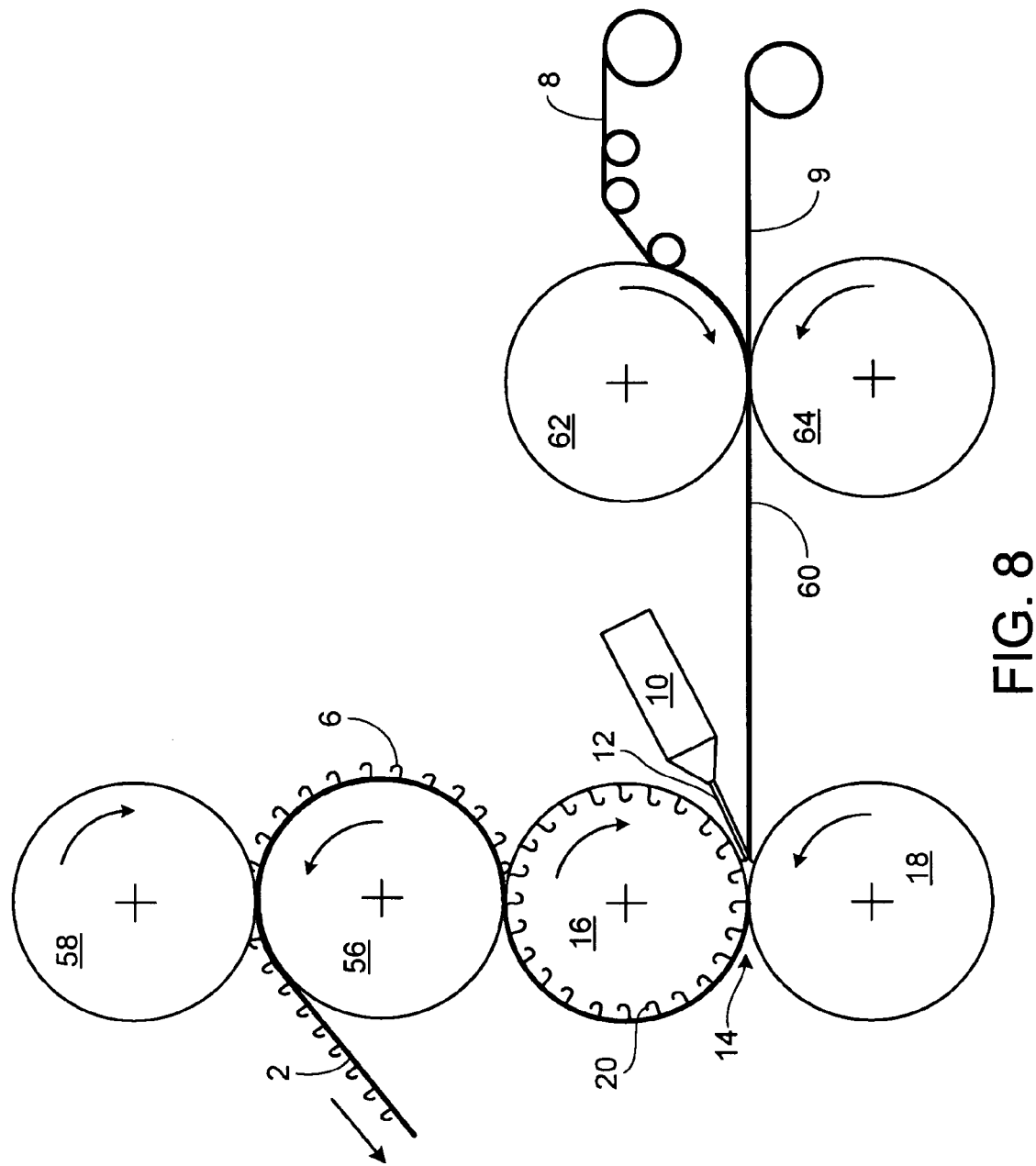
FIG. 8 illustrates another method and apparatus for producing the above described fiber optic cable.

FIG. 8 illustrates another method and apparatus for producing the above described fiber optic cable 2. This is a technique for avoiding any potential problems of centering optical fiber 8 by forming the fiber optic cable 2 in a two step process. Initially, an intermediate product 60 is formed by feeding optical fiber 8 and laminate 9 into a nip 14 formed by two pressure rolls 62 and 64. Similar to the pressure roll 18 described above with reference to FIG. 7, lower pressure roll 64 has peak and valley forming grooves on its surface to aid in guiding the wires laterally. Upper pressure roll 62 has a flat peripheral surface which forms a flat upper surface of the intermediate product 60. Intermediate product 60 is then fed into a nip 14 formed by a grooved pressure roll 18 and a mold roll 16 having fastener element shaped mold cavities 20. Simultaneously with intermediate product 60, molten resin 12 is introduced from extruder head 10 to the nip 14 directly adjacent the periphery of the mold roll 16 and fastener element shaped mold cavities 20 are formed in a manner similar to that described above with reference to FIG. 20. As the cooled mold roll continues to rotate, the resin and optical fibers 8 remain adjacent the periphery of the mold roll 16 until take-off rollers 56 and 58 strip the laminated fiber optic cable 2 from the mold roll 16, thus extracting the now solidified hooks 6 from their respective cavities 20. The laminated fiber optic cable 2 that emerges from the take-off rollers 56 and 58 includes fastener elements 6, an optical fiber 8 and a laminate 9 as shown in FIG. 1.

FIG. 9A-D illustrates another method and apparatus for producing the above described fiber optic cable 2. The method is a lamination process in which a pre-formed hook tape 70, spaced apart optical fibers 8 and a laminate 9 are simultaneously fed between two pressure rollers 74, 76. Pre-formed hook tape 70 is made of a thermoplastic resin, hook tape 70 having a base 78 defining first and second surfaces 80, 82. Hooks 84 are protrusions of the thermoplastic resin of first surface 80 and are suitable for engaging a loop material. Hook tape 70 is fed between the two pressure rollers 74 and 76 with its hook-bearing first surface 80 immediately adjacent the peripheral surface of the first pressure roll 74. The laminate 9 defines a first surface 86 and a second surface 88 and is fed between rolls 74 and 76 with its first surface 86 immediately adjacent the peripheral surface of pressure roll 76.

Simultaneously with hook tape 70 and laminate 9, a plurality of optical fibers 8 is introduced between pressure rollers 74, 76 in laterally spaced apart fashion. Optical fibers 8 are positioned between second surface 82 of hook tape 70 and second surface 88 of laminate 9. Pressure roll 74 has a series of protruding rings 90 arranged to contact first surface 92 of hook tape 70 only along regions 94 of the fiber optic cable 2 that lie between the spaced-apart optical fibers 8. Rolls 74 and 76 are heated and positioned to create pressure in the regions 94 corresponding to each ring 90 such that thermal bonding occurs along the contacted regions of fiber optic cable 2. The thermal bonding lines act to permanently weld hook tape 70 to laminate 9 in a manner that isolates optical fibers 8 from one another. Pre-formed hook tape 70 can be provided with regions 94 distinguished by flat areas (as illustrated in FIG. 9B) on first surface 80, i.e., areas lacking rows of hooks 84. Alternatively, first surface 80 of pre-formed hook tape 70 can have a uniform array of hooks 84 across its surface, the hooks in regions 94 subsequently coming into contact with rings 90 whereby the hooks 94 are melted and or crushed by the applied pressure and heat. Either way, the hooks remaining on first surface 80, i.e., those positioned between rings 90 during the lamination process, are sufficient to provide the necessary fastening capability with mating loop materials.

In another alternative, pressure roll 74 acts as an anvil (rotary or stationary) while pressure roll 76 is ultrasonically vibrated at a frequency which causes hook tape 70 to be welded to laminate 9 along the regions 94 where rings 90 contact hook tape 70.

Referring again to FIG. 9A and now also to FIG. 9E, fiber optic cable 2 is made by yet another laminating method. Hook tape 70 (as described above with reference to FIGS. 9A and 9B) is provided with a layer of adhesive 98 (shown as dashed lines in FIG. 9A) applied to its second surface 82 as it is fed between smooth pressure rolls 74 and 76. Similarly, laminate 9 is provided with a layer of adhesive 100 (dashed lines) applied to its second surface 88 as it is fed between rolls 74 and 76. However, unlike the methods discussed above, in this particular example rolls 74 and 76 both have a smoother outer surface, i.e., neither roll has the pressure rings 90 discussed above with reference to FIG. 9D. Optical fibers 8 are introduced between the rolls so as to be sandwiched between the hook tape 70 and laminate 9. The smooth pressure rolls are arranged to cause the adhesive 98 on second surface 82 of hook tape 70 and the adhesive 100 on second surface 88 of laminate 9 to contact one another, thereby bonding them together. The adhesive also contacts the optical fibers 8, at least partially encompassing them and acting in combination with the hook tape 70 and/or laminate 9 to envelop isolate the optical fibers 8 from one another. It is also possible to eliminate one of the adhesive layers 98, 100, the remaining adhesive layer being sufficient to bond hook tape 70 to laminate 9 while isolating the optical fibers 8 between the layers. It should be noted that in the adhesive laminating examples just discussed, the hooks 84 are not permanently deformed to any significant extent by their passage through the smooth pressure rollers. Rather the hooks are resilient enough to withstand the pressures applied by the unheated rolls.

Figure 10A:
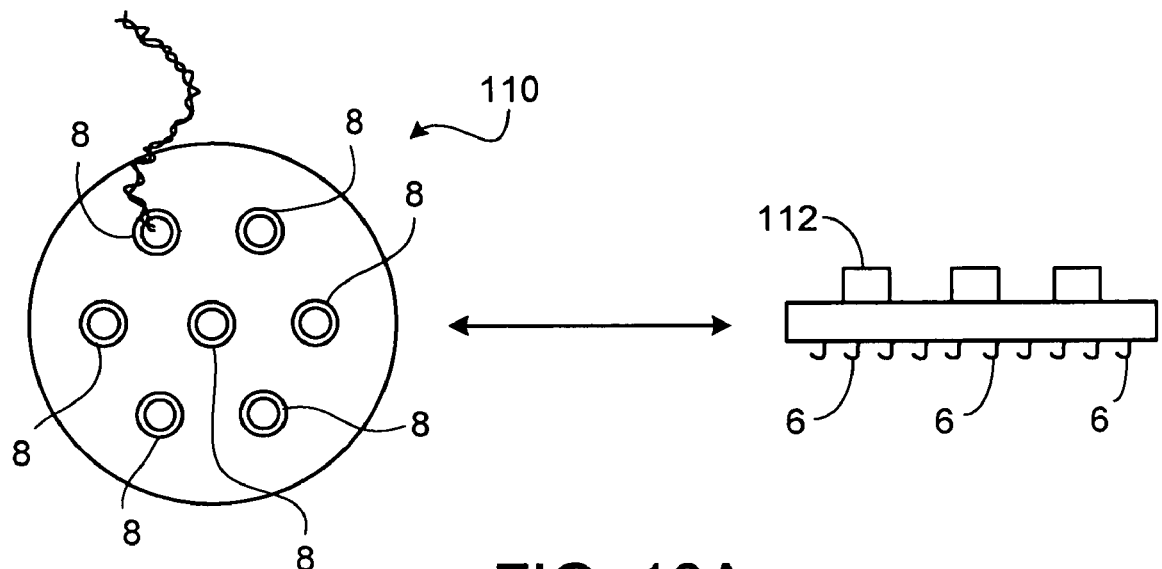
FIG. 10A-10E illustrates a variety of fiber optic cable having molded fasteners.
Figure 10B:
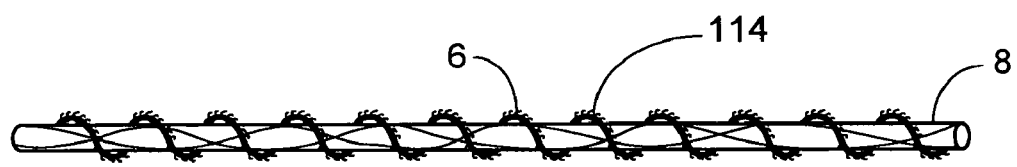
Figure 10C:
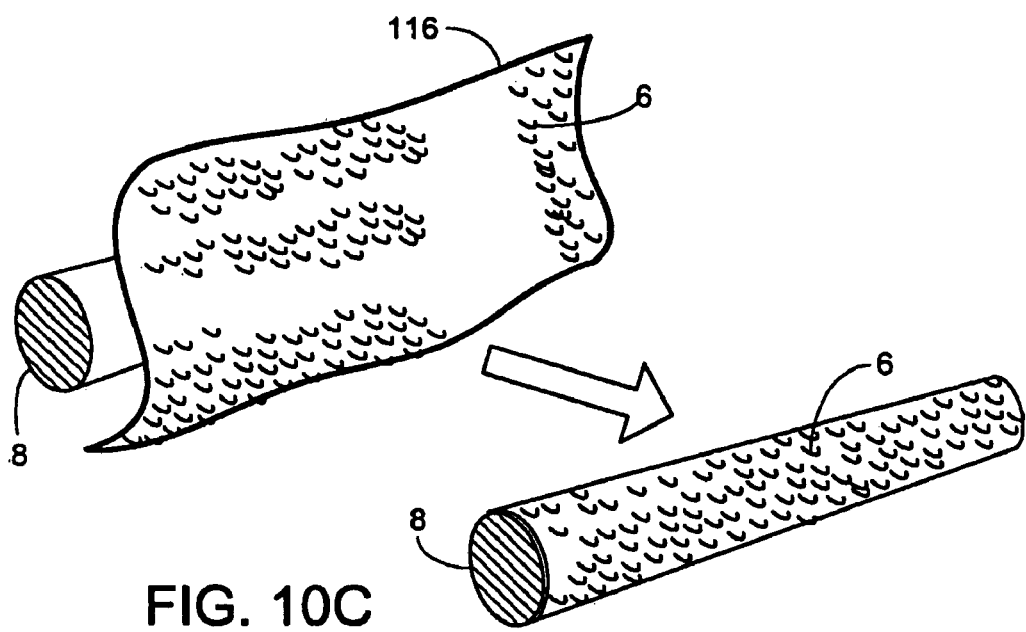
Figure 10D:
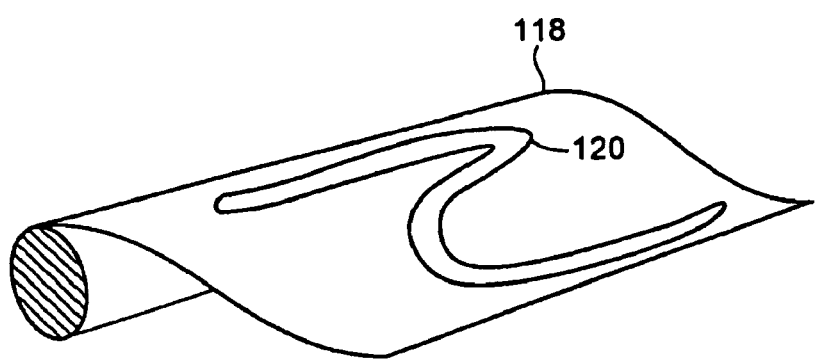
Figure 10E:
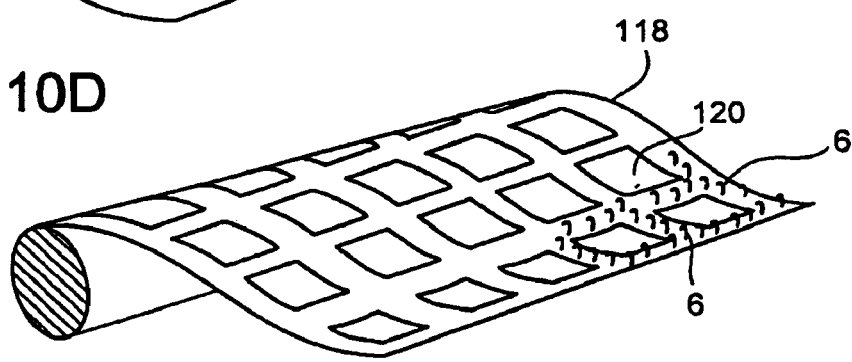

FIG. 10A illustrates a fiber optic cable 110 having optical fibers 8 extending from vias 112, on the opposing side are fastener elements 6. In FIG. 10B an optical fiber 8 is wrapped by a strand of fastener element 114. This allows a single optical fiber 8 to be placed in any orientation. In FIG. 10C, an optical fiber 8 is wrapped in a sheet of fastener elements. In FIG. 10D and FIG. 10C an optical fiber 8 is wrapped in a sheet of fastener elements 118 in which designs 120 have been manufactured allowing the light from the optical fiber 8 to emit through the design 120. The designs 120 could be on either side of the fiber optic cable.

In some embodiments, a clear thermoplastic is used to create transparent areas in which the light from the optical fiber is emitted. In some embodiments, the fastener elements are manufactured on both sides of the optical fiber cable. In some other embodiments, the fastener element is manufactured from the clear thermoplastic thereby allowing the light from the optical fiber to be emitted the fastener element.

A number of embodiments of the invention have been described. Nevertheless, it will be understood that various modifications may be made without departing from the spirit and scope of the invention.

What is claimed is:

1. A method of continuously forming an optical fiber cable, the method comprising:
   introducing a moldable resin into a gap formed adjacent a peripheral surface of a rotating mold roll, the mold roll defining an array of cavities therein, the moldable resin being introduced under pressure and temperature conditions selected to cause the moldable resin to at least partially fill the cavities to form fastener element stems integrally with and extending from one broad surface of a strip of said moldable resin; and
   introducing at least one longitudinally continuous optical fiber into the gap;
   wherein the optical fiber becomes integrated into the strip of moldable resin such that the optical fiber is at least partially exposed.

2. The method of claim 1 further comprising:
   simultaneously introducing a laminating material into the gap with the resin and the optical fiber;
   wherein the laminating material is secured to the strip of moldable resin such that the laminating material covers the optical fiber.

3. The method of claim 2 wherein the laminating material is secured to the strip of moldable resin after the strip is removed from the gap.

4. The method of claim 1 further comprising:
   providing a heat management system supported by the resin base, the heat management system arranged to conduct heat from the cable.

5. The method of claim 1 wherein the cavities of the mold roll are shaped to mold distal heads on said fastener element stems, said distal heads being shaped to overhang the broad surface of the strip of laminating material so as to be engageable with exposed loop fibers.

6. The method of claim 1 wherein each of said fastener element stems defines a tip portion, the method further comprising:
   deforming said tip portion of a plurality of said stems to form engaging heads overhanging the broad side of the strip of material, the engaging heads being shaped to be engageable with exposed loop fibers.

7. The method of claim 1 wherein the gap comprises a nip defined between the rotating mold roll and a counter-rotating pressure roll.

8. The method of claim 1 wherein the gap comprises a nip defined between the rotating mold roll and a counter-rotating mold roll, each of said rotating mold roll and said counter-rotating mold roll defining an array of cavities therein, the moldable resin being introduced under pressure and temperature conditions selected to cause the material to at least partially fill the array of cavities of each of said rotating and said counter-rotating mold roll to form fastener element stems integrally with and extending from each of opposite broad sides of the strip of said moldable resin.

9. The method of claim 1 wherein the moldable resin comprises a layer of thermoplastic resin and a film backing, the film backing carrying the optical fibers on a surface thereof, the layer of thermoplastic resin being introduced to the gap directly adjacent the rotating mold roll, the film backing carrying the optical fibers being introduced to the gap under pressure and temperature conditions which cause the film backing to become permanently bonded to the thermoplastic resin to at least partially envelop the optical fibers.

10. The method of claim 1 wherein the fastener element stems comprise heads that are mushroom shaped.

11. The method of claim 1 wherein the moldable resin comprises a first and a second film of thermoplastic resin, wherein the optical fibers and the first and second films are introduced to the gap with the optical fibers disposed between the first and the second film said first film being introduced directly adjacent the rotating mold roll under temperature and pressure conditions that cause the first and second films to become permanently bonded to each other in a manner enveloping the optical fibers.

12. The method of claim 2 further comprising downstream of the gap, longitudinally severing the laminating material after solidification to form two optical fiber cables, each cable containing at least one said optical fiber.

13. A method of continuously forming an optical fiber cable, the method comprising:
   introducing molten resin into a gap formed adjacent a rotating mold roll, the mold roll having a peripheral surface defining an array of mold cavities therein, under pressure and temperature conditions selected to cause the resin to fill the mold cavities and form an array of fastener element stems integrally molded with and extending from a broad strip of the resin; while
   simultaneously introducing a preformed optical fiber ribbon-type cable to the nip adjacent the pressure roll, such that the broad strip of resin becomes permanently bonded to a broad side of the ribbon-type cable such that the fastener element stems are exposed.

14. A method of continuously forming an optical fiber cable, the method comprising:
   providing a fastener tape of continuous length, the fastener tape comprising:
   a base of thermoplastic resin and defining a first and a second, opposite, broad surface; and
   an array of loop-engageable fastener elements, the array of loop engageable fastener elements comprising protrusions of the thermoplastic resin of the first surface;
   arranging a backing film of continuous length adjacent the fastener tape, the backing film defining a broad surface, the broad surface of the backing film being arranged to face the second broad surface of the fastener tape;
   disposing a plurality of spaced apart optical fibers of continuous length between the second broad surface of the fastener tape and the broad surface of the backing film; and
   permanently attaching the fastener tape to the backing film with the plurality of optical fibers enveloped therebetween.

15. The method of claim 14 wherein said step of permanently attaching the fastener tape to the backing film comprises intermittently heat welding along locations between said conductors.

16. The method of claim 15 wherein said step of permanently attaching the fastener tape to the backing film comprises continuously heat welding along locations between said conductors.

17. A method of forming an optical fiber cable, the method comprising:
   introducing a strip of laminating material into a gap formed adjacent a peripheral surface of a rotating roll;
   while introducing a continuous strip of loop material having hook-engageable fiber portion to the gap adjacent the surface of the roll, under conditions selected to cause the loop material to become at least partially embedded in the laminating material to permanently bond the loop material to the laminating material while leaving the hook-engageable fiber portion exposed for engagement; and
   introducing at least two longitudinally continuous and spaced apart optical fibers to the gap so as to cause the material to envelop and isolate the optical fibers in the gap to form a multi-optical fibers cable having engageable loops extending from an outer surface thereof.

* * * * *

UNITED STATES PATENT AND TRADEMARK OFFICE
CERTIFICATE OF CORRECTION

PATENT NO. : 7,412,139 B2  Page 1 of 1
APPLICATION NO. : 11/300216
DATED : August 12, 2008
INVENTOR(S) : Howard A. Kingsford et al.

It is certified that error appears in the above-identified patent and that said Letters Patent is hereby corrected as shown below:

In Claim 11, at Column 12, line 1, after the "second film" insert --,--.

Signed and Sealed this

Thirtieth Day of December, 2008

JON W. DUDAS
*Director of the United States Patent and Trademark Office*